US012600234B2

(12) United States Patent
Tanaka et al.

(10) Patent No.: US 12,600,234 B2
(45) Date of Patent: Apr. 14, 2026

(54) DISPLAY DEVICE, DISPLAY METHOD, AND RECORDING MEDIUM

(71) Applicant: Panasonic Automotive Systems Co., Ltd., Kanagawa (JP)

(72) Inventors: Akira Tanaka, Osaka (JP); Fumihito Inukai, Kyoto (JP); Hiroya Oue, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/188,281

(22) Filed: Apr. 24, 2025

(65) Prior Publication Data

US 2025/0353373 A1     Nov. 20, 2025

(30) Foreign Application Priority Data

May 16, 2024     (JP) ................................. 2024-080029

(51) Int. Cl.
    *B60K 35/233*     (2024.01)
    *B60K 35/22*     (2024.01)
(52) U.S. Cl.
    CPC ...... *B60K 35/233* (2024.01); *B60K 2360/166* (2024.01)
(58) Field of Classification Search
    CPC ........................... G01C 21/34; G08G 1/096861
    See application file for complete search history.

(56) References Cited

U.S. PATENT DOCUMENTS

| | | | | |
|---|---|---|---|---|
| 6,266,613 B1 * | 7/2001 | Nimura | ................ | G08G 1/0969 |
| | | | | 701/418 |
| 6,282,492 B1 * | 8/2001 | Gorai | ..................... | G01C 21/34 |
| | | | | 701/428 |
| 7,502,685 B2 * | 3/2009 | Nakamura | ......... | G01C 21/3632 |
| | | | | 345/589 |
| 9,459,115 B1 * | 10/2016 | Elliott | .................... | G01C 21/36 |
| 11,650,069 B2 * | 5/2023 | Lee | ........................ | G02B 27/01 |
| | | | | 701/431 |
| 12,013,254 B2 * | 6/2024 | Nishida | ................ | G01C 21/365 |
| 2009/0112462 A1 * | 4/2009 | Lo | ...................... | G01C 21/3632 |
| | | | | 701/533 |

(Continued)

FOREIGN PATENT DOCUMENTS

| | | |
|---|---|---|
| JP | 2020-159953 | 10/2020 |
| WO | 2015/118859 | 8/2015 |

*Primary Examiner* — Sepehr Azari
(74) *Attorney, Agent, or Firm* — Greenblum & Bernstein, P.L.C.

(57)     ABSTRACT

A display device includes: a displayer that displays a guidance display object for guidance along a travel route; an obtainer that obtains, a remaining distance from a current position of the mobile body up to a guide position; and a controller that determines a display position of the guidance display object when it is to be displayed, and causes the displayer to display the guidance display object at the display position determined. The controller: changes the display position to cause the guidance display object to transition from the current position up to the guide position, when the remaining distance is at least a threshold value; and changes the display position to cause the guidance display object to transition from the current position up to a target position offset ahead of the guide position, when the remaining distance is less than the threshold value.

13 Claims, 11 Drawing Sheets

(56)               References Cited

U.S. PATENT DOCUMENTS

| | | | |
|---|---|---|---|
| 2009/0222203 A1* | 9/2009 | Mueller | G01C 21/3632 |
| | | | 701/431 |
| 2010/0131190 A1* | 5/2010 | Terauchi | G01C 21/3658 |
| | | | 701/533 |
| 2012/0303274 A1* | 11/2012 | Su | G01C 21/3632 |
| | | | 701/538 |
| 2014/0114575 A1* | 4/2014 | Alders | G01C 21/3655 |
| | | | 701/538 |
| 2016/0019786 A1* | 1/2016 | Yoon | G08G 1/0962 |
| | | | 340/905 |
| 2016/0327402 A1* | 11/2016 | Funabiki | B60K 35/29 |
| 2018/0218603 A1* | 8/2018 | Torii | G08G 1/096861 |
| 2020/0114916 A1* | 4/2020 | Oguro | B60W 30/08 |
| 2020/0312146 A1* | 10/2020 | Tanaka | G01C 21/365 |
| 2020/0406754 A1* | 12/2020 | Kassner | B60K 35/10 |
| 2021/0063185 A1* | 3/2021 | Kawai | G01C 21/3635 |
| 2021/0223058 A1* | 7/2021 | Horihata | G01C 21/3635 |
| 2021/0231445 A1* | 7/2021 | Migita | G01C 21/3438 |
| 2021/0356289 A1* | 11/2021 | Horihata | G01C 21/3644 |
| 2021/0372810 A1* | 12/2021 | Hato | G08G 1/09626 |
| 2022/0084458 A1* | 3/2022 | Sakuma | G09G 3/2096 |
| 2022/0107201 A1* | 4/2022 | Yagyu | B60K 35/10 |
| 2022/0316902 A1* | 10/2022 | Tajima | B60K 35/81 |
| 2023/0009636 A1* | 1/2023 | Zhang | B60K 35/28 |
| 2023/0013965 A1* | 1/2023 | Miyake | G01C 21/365 |
| 2023/0135641 A1* | 5/2023 | Miyake | G06V 20/588 |
| | | | 701/36 |
| 2023/0400321 A1* | 12/2023 | Lee | B60R 1/24 |
| 2024/0416969 A1* | 12/2024 | Fan | G01C 21/26 |
| 2025/0050896 A1* | 2/2025 | Fan | B60W 60/0053 |
| 2025/0137801 A1* | 5/2025 | Sahara | G09G 3/001 |

* cited by examiner

FIG. 11

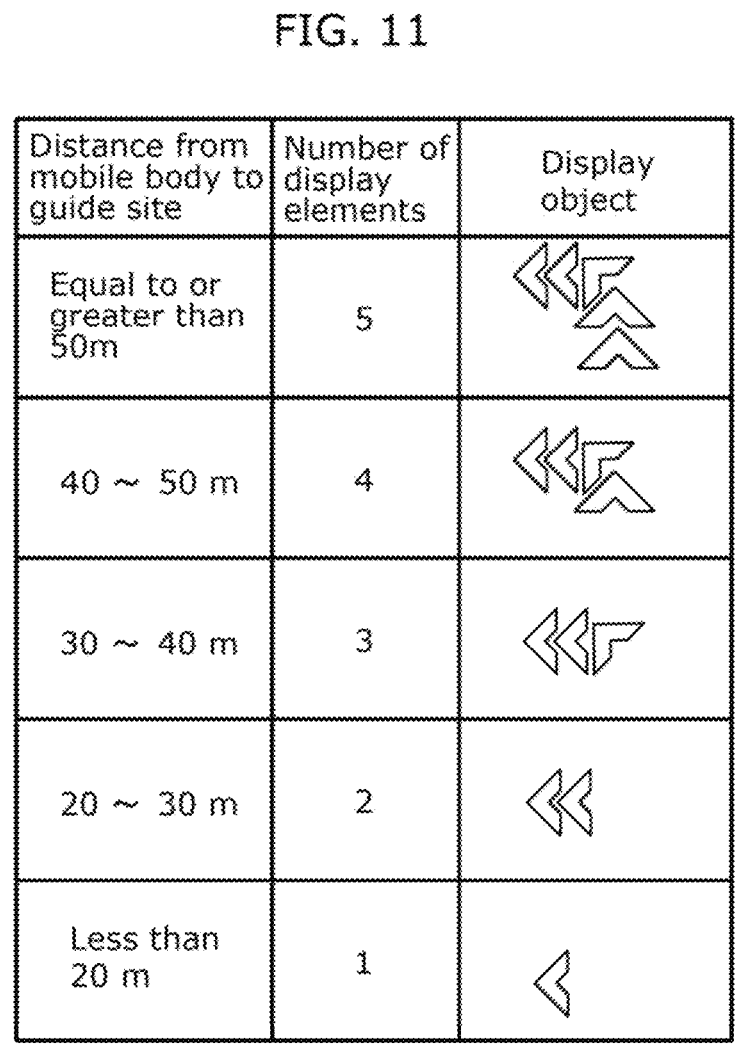

| Distance from mobile body to guide site | Number of display elements | Display object |
|---|---|---|
| Equal to or greater than 50m | 5 | |
| 40 ～ 50 m | 4 | |
| 30 ～ 40 m | 3 | |
| 20 ～ 30 m | 2 | |
| Less than 20 m | 1 | |

FIG. 12

| Distance from mobile body to guide site | Distance from guide position to guidance display object | Distance from mobile body to guidance display object | Number of display elements | Display object |
|---|---|---|---|---|
| 35 m | 15 m | 50 m | 5 | |
| 30 m | 10 m | 40 m | 4 | |
| 25 m | 5 m | 30 m | 3 | |
| 20 m | 0 m | 20 m | 2 | |
| 10 m | 0 m | 10 m | 1 | |

DISPLAY DEVICE, DISPLAY METHOD, AND RECORDING MEDIUM

CROSS REFERENCE TO RELATED APPLICATION

The present application is based on and claims priority of Japanese Patent Application No. 2024-080029 filed on May 16, 2024.

FIELD

The present disclosure relates to a display device that makes an image visible to a user as a virtual image, to a display method used by the display device, and to a recording medium.

BACKGROUND ART

Conventionally, there is proposed a display system (in other words, a display device) that projects light representing an image onto a tabular light-transmissive display medium, and the light is reflected (projected) by the display medium, enabling the user to see the background beyond the display medium while making the image visible to the user as a virtual image. Such a display system uses so-called augmented reality (AR), and can display, in an actual background, an image related to the background. Particularly, in automobile-related fields, and the like, a so-called head-up display device (HUD) which, during driving, displays, in front of the windshield, an image showing the speed and various types of warnings, as a virtual image (see Patent Literature (PTL) 1, for example).

When such a display device is used, a driver who is the user can view a display object (for example, a map, a speedometer, a guidance display object of a navigation function, or the like) that is an image related to driving, while viewing the forward external surroundings and without having to significantly move his or her line of sight, thereby enabling safer driving.

CITATION LIST

Patent Literature

PTL 1: International Publication WO2015/118859

SUMMARY

However, the display device can be improved upon.

In view of this, the present disclosure provides a display device, and so on, capable of improving on the above related art.

A display device according to an aspect of the present disclosure includes: a displayer that displays, over a travel route that includes one or more guide sites that a mobile body will pass through in future, a guidance display object for guidance along the travel route, each of the one or more guide sites being a site at which a course of the mobile body is to change; an obtainer that updates a guide site that the mobile body will pass through next among the one or more guide sites, and obtains, for the guide site updated, a remaining distance from a current position being displayed up to a guide position being displayed, the current position corresponding to the mobile body, the guide position corresponding to the guide site updated; and a controller that determines a display position of the guidance display object when the guidance display object is to be displayed, and causes the displayer to display the guidance display object at the display position determined, wherein the controller: changes the display position to be determined to cause the guidance display object to transition through an area from the current position up to the guide position, when the remaining distance is greater than or equal to a threshold value; and changes the display position to be determined to cause the guidance display object to transition through an area from the current position up to a target position that is offset ahead of the guide position, when the remaining distance is less than the threshold value.

A display method according to an aspect of the present disclosure is display method to be executed by a computer, and includes: displaying, over a travel route that includes one or more guide sites that a mobile body will pass through in future, a guidance display object for guidance along the travel route, each of the one or more guide sites being a site at which a course of the mobile body is to change; updating a guide site that the mobile body will pass through next among the one or more guide sites, and obtaining, for the guide site updated, a remaining distance from a current position being displayed up to a guide position being displayed, the current position corresponding to the mobile body, the guide position corresponding to the guide site updated; and determining a display position of the guidance display object when the guidance display object is to be displayed, and controlling to cause, in the displaying, the guidance display object to be displayed at the display position determined, wherein the controlling includes: changing the display position to be determined to cause the guidance display object to transition through an area from the current position up to the guide position, when the remaining distance is greater than or equal to a threshold value; and changing the display position to be determined to cause the guidance display object to transition through an area from the current position up to a target position that is offset ahead of the guide position, when the remaining distance is less than the threshold value.

It should be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium. Furthermore, the recording medium may be a non-transitory recording medium.

A display device, and so on, according to an aspect of the present disclosure is capable of improving upon the above related art.

Further advantages and effects of one aspect of the present disclosure will become apparent from the description and drawings. Although each of these advantages and/or effects are provided by several elements described in the embodiments as well as the written description and drawings, all of the elements are not necessarily required in order to obtain one or more of the same advantages or effects.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 11 is a diagram for describing changes in display configuration of the display element according to yet another example of the embodiment.

FIG. 12 is a diagram for describing changes in display configuration of the display element according to yet another example of the embodiment.

DESCRIPTION OF EMBODIMENTS (Underlying Knowledge Forming Basis of the Present Disclosure)

The inventors have found that a problem in which a display device such as the display system in PTL 1 described in the [Background Art] section may not be able to display appropriately can occur.

In a mobile body, such as a vehicle, the display system in PTL 1 displays an image of a guidance display object that indicates a course for guidance in order to guide (navigate) the mobile body along a travel route. The image is displayed in a limited range, in order to avoid unnecessarily obstructing the field of view of the user. Therefore, in order that the guidance display object is likely to catch the eye of the user, the display position of the guidance display object preferably transitions in the time domain like an animation. Such a transition of the display position is particularly effective at sites where the course changes (referred to as guide sites hereinafter), such as an intersection (including a case where the mobile body goes straight through the intersection), a crossroads, and a junction. Here, with reference to FIGS. 1 and 2, problems in the case where the display position transitions will be described.

Figure 1:
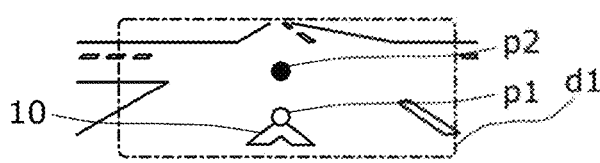
FIG. 1 is a diagram for describing a problem regarding a display device.
Figure 1:
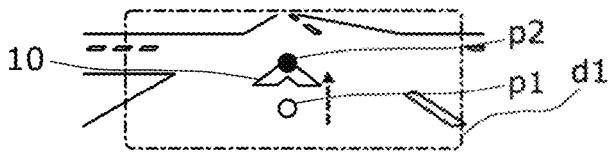
Figure 2:
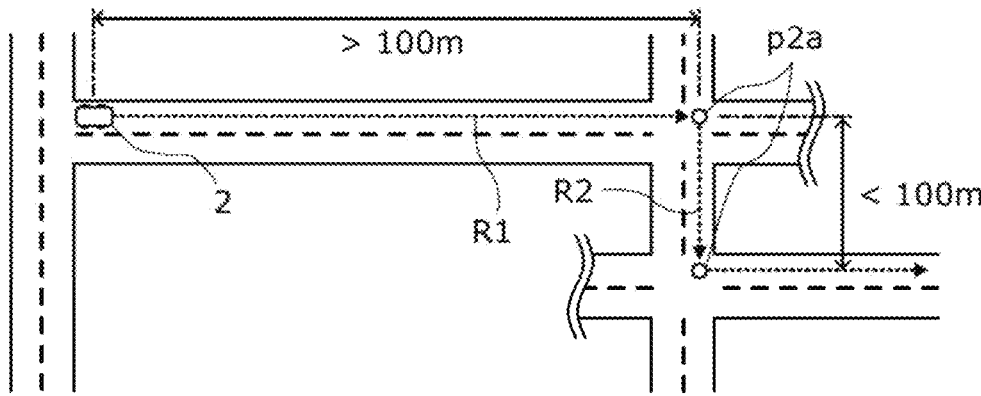
FIG. 2 is a diagram for describing a problem regarding the display device.

FIGS. 1 and 2 are diagrams for describing problems of a display device. Note that the upper part and the lower part of FIG. 1 show how the position of guidance display object 10 changes. For example, FIG. 1 shows how guidance display object 10 is displayed, in display range d1 that can be displayed by the display device, for guiding a vehicle along a travel route. When the vehicle is traveling, the display device displays guidance display object 10 at current position p1 that corresponds to the site where the vehicle is currently traveling. In this process, for example, guidance display object 10 displayed on the display device is reflected on the windshield of the vehicle to the eyes of the user, and the user sees a virtual image of guidance display object 10 as if guidance display object 10 exists at a position at a distance of several to several tens of meters ahead of the user beyond the windshield. Current position p1 is the position at a distance of several to several tens of meters ahead of the user described above, which corresponds to the current site of the vehicle traveling.

The user can understand the course of the vehicle the user should take by seeing the virtual image of guidance display object 10. Guidance display object 10 is an arrow, and therefore, the user can understand the direction the user should take when the vehicle travels several to several tens of meters ahead. For example, if the arrow of guidance display object 10 points to the right, the user can understand that the user should turn to the right when the vehicle travels several meters to several tens of meters ahead.

As the transition of the display position described above, for example, the display device then changes, in the time domain, the position of guidance display object 10 being displayed from current position p1 to guide position p2 being displayed. Here, current position p1 corresponds to the site where the vehicle is currently traveling, and guide position p2 being displayed corresponds to an intersection, which is an example of guide sites at which the course of the vehicle changes. Such a change has advantages that the change is likely to catch the eye of the user and the user can instinctively understand that the user is approaching an intersection (that is, a guide site).

Consider a case where there is a sufficient distance between current position p1 and guide position p2. For example, provided that vehicle 2 travels along a travel route indicated by the dashed line arrow in FIG. 2, when vehicle 2 is traveling along route R1 extending in the left-right direction in the sheet, guide site p2*a* is 100 m or more away from vehicle 2, that is, sufficiently away from vehicle 2. Therefore, when the position of guidance display object 10 being displayed is changed from current position p1 to guide position p2 in the time domain, the change is significant and effectively catches the eye of the user. However, when vehicle 2 is traveling along route R2 extending in the up-down direction in the sheet, guide site p2*a* is within 100 m from vehicle 2. Therefore, when the position of guidance display object 10 being displayed is changed from current position p1 to guide position p2 in the time domain, the change is not significant. Therefore, the change less effectively catches the eye of the user. In this way, when next guide site p2*a* is unnecessarily close to vehicle 2, even if the position of guidance display object 10 being displayed is changed in the time domain, the change less effectively catches the eye of the user, and an appropriate display may not be able to be provided. Note that possible cases where guide site p2*a* is unnecessarily close to vehicle 2 include a case where two successive guide sites p2*a* are close to each other and a case where the site where vehicle 2 is started is close to next guide site p2*a*.

Figure 3:
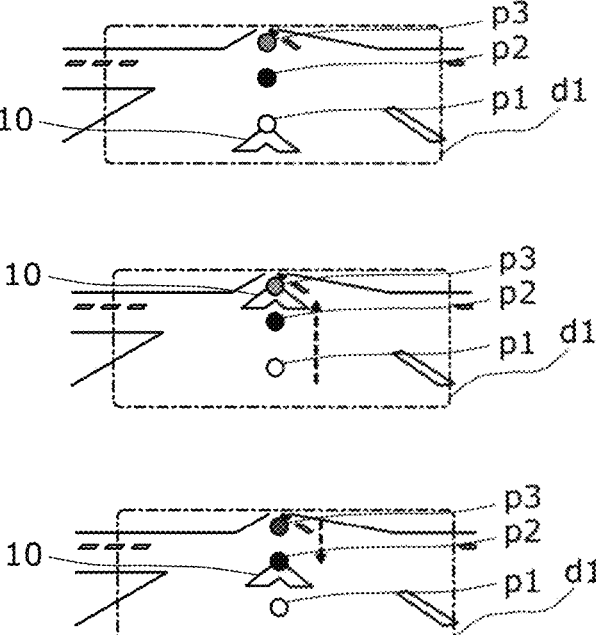
FIG. 3 is a diagram for describing an overview of a display device according to an embodiment.

In view of this, in the present disclosure, target position p3 that is offset ahead of guide position p2 is used as shown in FIG. 3. FIG. 3 is a diagram for describing an overview of a display device according to an embodiment. Note that the upper part, the middle part, and the lower part of FIG. 3 show how the position of guidance display object 10 changes.

As shown in FIG. 3, in the present disclosure, the position of guidance display object 10 being displayed is changed in the time domain from current position p1 to a position further ahead than guide position p2, specifically, target position p3 that corresponds to a site that is offset ahead of guide position p2, and the position of guidance display object 10 being displayed is then changed in the time domain from target position p3 to guide position p2. In this way, even if next guide site p2a is unnecessarily close, the position of guidance display object 10 being displayed can be sufficiently changed, so that the effect of catching the eye of the user can be kept high. In this way, the present disclosure provides a display device that can provide a more appropriate display.

More specifically, the display device according to the present disclosure includes the features described below.

A display device according to a first aspect of the present disclosure includes: a displayer that displays, over a travel route that includes one or more guide sites that a mobile body will pass through in future, a guidance display object for guidance along the travel route, each of the one or more guide sites being a site at which a course of the mobile body is to change; an obtainer that updates a guide site that the mobile body will pass through next among the one or more guide sites, and obtains, for the guide site updated, a remaining distance from a current position being displayed up to a guide position being displayed, the current position corresponding to the mobile body, the guide position corresponding to the guide site updated; and a controller that determines a display position of the guidance display object when the guidance display object is to be displayed, and causes the displayer to display the guidance display object at the display position determined. Here, the controller: changes the display position to be determined to cause the guidance display object to transition through an area from the current position up to the guide position, when the remaining distance is greater than or equal to a threshold value; and changes the display position to be determined to cause the guidance display object to transition through an area from the current position up to a target position that is offset ahead of the guide position, when the remaining distance is less than the threshold value.

Accordingly, through the display of the guidance display object, a user can be guided to a guide site at which the course of the mobile body will change. Here, it is possible to display the guidance display object by changing the display position to be determined to cause the guidance display object to transition through an area from the current position up to the guide position, when the remaining distance is greater than or equal to a threshold value; and changing the display position to be determined to cause the guidance display object to transition through an area from the current position up to a target position that is offset ahead of the guide position, when the remaining distance is less than the threshold value. As a result, if the remaining distance is less than the threshold value and, for example, the guidance display object is caused to transition through an area up to the guide position but transitioning over a sufficient distance is still not possible, the distance for the transitioning of the guidance display object can be secured since it is possible to cause the guidance display object to transition up to the target position. With this, it is possible to cause the guidance display object to transition over a sufficient distance, regardless of the remaining distance. In this manner, since the transitioning of the guidance display object can provide a sufficient change in position, the effect of drawing the user's attention can be kept high. Therefore, more appropriate display becomes possible.

Furthermore, a display device according to a second aspect is the display device according to the first aspect, in which, after changing the display position to be determined to cause the guidance display object to transition through the area from the current position up to the target position when the remaining distance is less than the threshold value, the controller further changes the display position to be determined to cause the display position to transition through an area from the target position up to the guide position.

Accordingly, it is possible to display the guidance display object by further changing the display position to be determined to cause the guidance display object to transition through the area from the target position up to the guide position.

Furthermore, a display device according to a third aspect is the display device according to the first aspect or the second aspect, in which, the controller: determines a display configuration of the guidance display object when the guidance display object is to be displayed, and causes the displayer to display the guidance display object in the display configuration determined; and after changing the display position to be determined to cause the guidance display object to transition through the area from the current position up to the target position when the remaining distance is less than the threshold value, further changes the display configuration to be determined.

Accordingly, it is possible to display the guidance display object by changing the display configuration to be determined.

Furthermore, a display device according to a fourth aspect is the display device according to the third aspect, in which, the display configuration includes a total number of display elements included in the guidance display object. Furthermore, the controller: after changing the display position to be determined to cause the guidance display object to transition through the area from the current position up to the target position when the remaining distance is less than the threshold value, changes the display configuration to cause the total number of the display elements to increase; and changes the display configuration to cause the total number of the display elements that has been increased to decrease as the mobile body approaches the guide site.

Accordingly, it is possible to display the guidance display object by changing the display configuration to cause the total number of the display elements to increase, and changing the display configuration to cause the total number of the display elements that has been increased to decrease as the mobile body approaches the guide site.

Furthermore, a display device according to a fifth aspect is the display device according to any one of the first to fourth aspects, in which, the threshold value is defined by a length of a distance or by an angle formed between straight lines each connecting a reference point and a different one of two points, the two points being separated from each other by the distance.

Accordingly, comparison of the remaining distance can be performed using, as a reference, the threshold value that is defined by a length of a distance or is defined by an angle formed between straight lines each connecting a reference point and a different one of two points that are separated from each other by the distance.

Furthermore, a display device according to a sixth aspect is the display device according to any one of the first to fifth aspects, in which, an amount of the offset between the guide position and the target position is defined by a length of a distance or by an angle formed between straight lines each connecting a reference point and a different one of two points, the two points being separated from each other by the distance.

Accordingly, it is possible to cause the guidance display object to transition according to the amount of the offset which is defined by a length of a distance or is defined by an angle formed between straight lines each connecting a reference point and a different one of two points that are separated from each other by the distance.

Furthermore, a display device according to a seventh aspect is the display device according to any one of the first to sixth aspects, in which, the obtainer further obtains a traveling speed of the mobile body, and an amount of the offset between the guide position and the target position is larger as the traveling speed obtained is faster.

Accordingly, it is possible to cause the guidance display object to transition according to the amount of the offset which is larger as the traveling speed of the mobile body is faster.

Furthermore, a display device according to an eighth aspect is the display device according to any one of the first to seventh aspects, in which, the obtainer further obtains a traveling speed of the mobile body, and the controller changes the display position to be determined to cause a rate of change of the display position to be faster as the traveling speed obtained is faster.

Accordingly, it is possible to display the guidance display object by changing the display position to be determined to cause the rate of change of the display position to be faster as the traveling speed of the mobile body is faster.

Furthermore, a display device according to a ninth aspect is the display device according to any one of the first to eighth aspects, in which, the controller changes the display position to be determined to cause a rate of change of the display position to be faster as the remaining distance is shorter.

Accordingly, it is possible to display the guidance display object by changing the display position to be determined to cause the rate of change of the display position to be faster as the remaining distance is shorter.

Furthermore, a display device according to a tenth aspect is the display device according to any one of the first to ninth aspects, in which, when the remaining distance is less than the threshold value, the controller changes the display position to be determined to cause a rate of change of the display position to be faster through an area from the guide position up to the target position than through the area from the current position to the guide position.

Accordingly, it is possible to display the guidance display object by changing by changing the display position to be determined to cause the rate of change of the display position to be faster through an area from the guide position to the target position than through the area from the current position to the guide position.

Furthermore, a display device according to an eleventh aspect is the display device according to any one of the first to tenth aspects, in which, the controller projects an image light toward a display medium of the mobile body to make a virtual image of the guidance display object visible to a user of the mobile body, the virtual image being formed beyond the display medium by the image light that is reflected from the display medium.

Accordingly, by projecting an image light toward a display medium of the mobile body, a virtual image of the guidance display object which is formed beyond the display medium by the image light that is reflected from the display medium can be made visible to a user of the mobile body.

A display method according to a twelfth aspect of the present disclosure is display method to be executed by a computer, and includes: displaying, over a travel route that includes one or more guide sites that a mobile body will pass through in future, a guidance display object for guidance along the travel route, each of the one or more guide sites being a site at which a course of the mobile body is to change; updating a guide site that the mobile body will pass through next among the one or more guide sites, and obtaining, for the guide site updated, a remaining distance from a current position being displayed up to a guide position being displayed, the current position corresponding to the mobile body, the guide position corresponding to the guide site updated; and determining a display position of the guidance display object when the guidance display object is to be displayed, and controlling to cause, in the displaying, the guidance display object to be displayed at the display position determined. Here, the controlling includes: changing the display position to be determined to cause the guidance display object to transition through an area from the current position up to the guide position, when the remaining distance is greater than or equal to a threshold value; and changing the display position to be determined to cause the guidance display object to transition through an area from the current position up to a target position that is offset ahead of the guide position, when the remaining distance is less than the threshold value.

Accordingly, the same advantageous effects as those of the aforementioned display device can be produced.

Furthermore, a program according to a thirteenth aspect is a program for causing the computer to execute the display method according to the twelfth aspect.

Accordingly, the same advantageous effects as those of the aforementioned display device can be produced using a computer.

It should be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium. Furthermore, the recording medium may be a non-transitory recording medium.

Hereinafter, embodiments will be described with reference to the drawings.

Each of the embodiments described below indicates a general or specific example. The numerical values, shapes, materials, elements, arrangement and connection of the elements, steps, order of the steps, etc., shown in the following embodiments are mere examples and are not intended to limit the present disclosure. Among elements in the following embodiments, those not in any of the independent claims which indicate the broadest concepts are described as optional elements.

Furthermore, each figure is schematically illustrated and not necessarily a precise depiction. Moreover, in the figures, elements that are essentially the same are given the same reference signs.

Furthermore, although a vehicle is described as an example of a mobile body in the subsequent description, the mobile body is not limited to a vehicle. The mobile body includes, in addition to vehicles, all mobile bodies that travel with a user onboard, such as watercraft or aircraft.

Furthermore, in the subsequent description, the display device is exemplified as a display device of a type that projects image light to a display medium such as a windshield or a combiner of a vehicle so that the reflected light reaches the eyes of a user to thereby enable the user to see a virtual image formed on the outside beyond the display medium. However, the display device also includes a display device that is for car navigation and is provided with a display that is installed in a center console panel.

It should be noted that, in the subsequent description, there are cases where real-life spatial coordinates and image coordinates being displayed are distinguished using the expressions "site" and "position", respectively.

Embodiment

Overall Configuration

Figure 4:
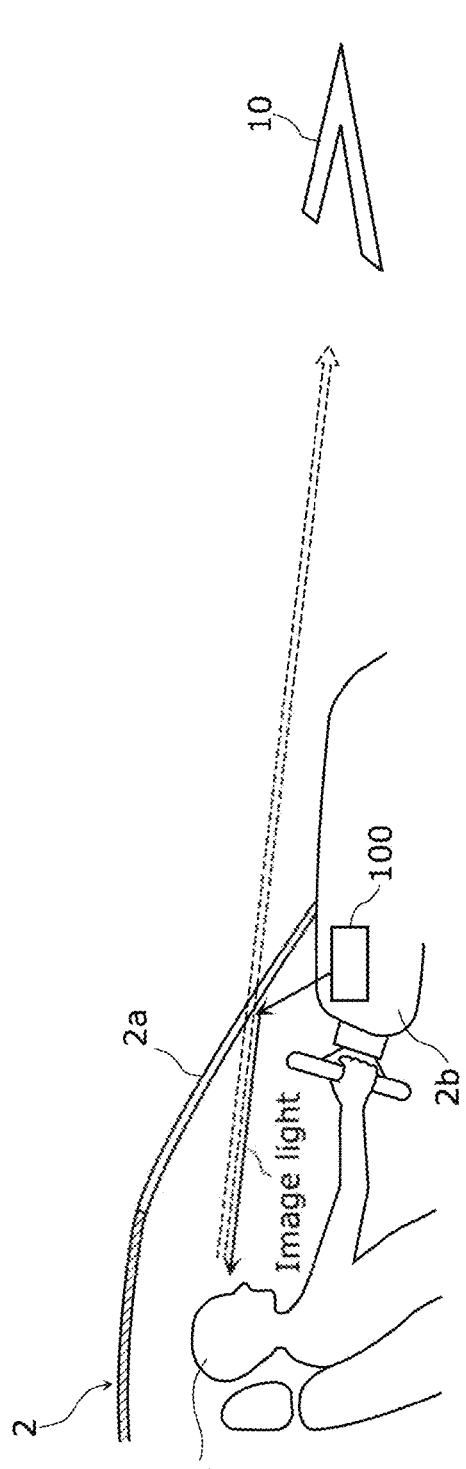
FIG. 4 is a diagram illustrating an example of use of the display device according to the embodiment.

FIG. 4 is a diagram illustrating an example of use of the display device according to the present embodiment.

Display device 100 according to this embodiment is configured as a head-up display (HUD) and is installed in vehicle 2. In a specific example, display device 100 is incorporated in dashboard 2b of vehicle 2.

Display device 100 projects image light indicating guidance display object 10 to windshield 2a of vehicle 2. The image light is then reflected on windshield 2a to user 1, who is the driver of vehicle 2, for example. In this way, guidance display object 10 is made visible to user 1 as a virtual image via windshield 2a. That is, display device 100 makes guidance display object 10 visible to user 1 as a virtual image. Note that making guidance display object 10 visible to user 1 as a virtual image in this way will be referred to also as displaying guidance display object 10 hereinafter, and the operation of projecting the image light is equivalent to the operation of displaying guidance display object 10. Furthermore, windshield 2a is an example of a display medium. Although the display medium is windshield 2a in this embodiment, when vehicle 2 is provided with a combiner, display device 100 may project the image light to the combiner serving as a display medium.

Windshield 2a is a display medium that is light-transmissive and has a plate-like shape. Therefore, display device 100 makes guidance display object 10 visible to user 1 as a virtual image while enabling user 1 to see the background, such as a road surface, beyond windshield 2a. That is, guidance display object 10 can be displayed on the actual background by AR.

Guidance display object 10 is an image having a shape that indicates one direction. A specific example is a planar image having a shape along a traveling surface (road surface) ahead in the traveling direction of vehicle 2, such as an arrow. Note that the one direction is the direction of the tip of the arrow and is referred to also as a traveling direction hereinafter. The traveling direction of guidance display object 10 is the direction of guidance of vehicle 2 to a destination, that is, the navigation direction.

Thus, display device 100 enables user 1 who is the driver to see guidance display object 10 without significantly moving the line of sight while seeing the environment ahead of user 1, thereby enabling user 1 to more safely recognize the navigation direction during driving.

Figure 5:
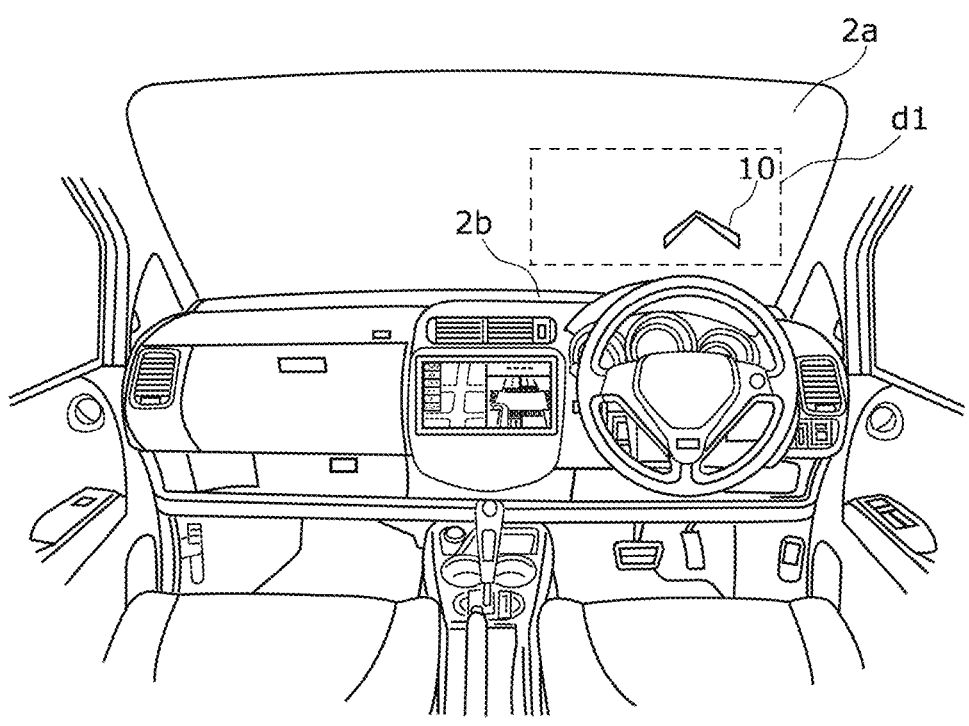
FIG. 5 is a diagram illustrating an example of the interior of a vehicle including the display device according to the embodiment.

FIG. 5 is a diagram illustrating an example of the interior of a vehicle provided with the display device according to the embodiment.

Display device 100 is hidden in dashboard 2b and projects the image light to windshield 2a. For example, as a result of the projection of the image light by display device 100, guidance display object 10 appears as a virtual image in display range d1 on windshield 2a.

Figure 6:
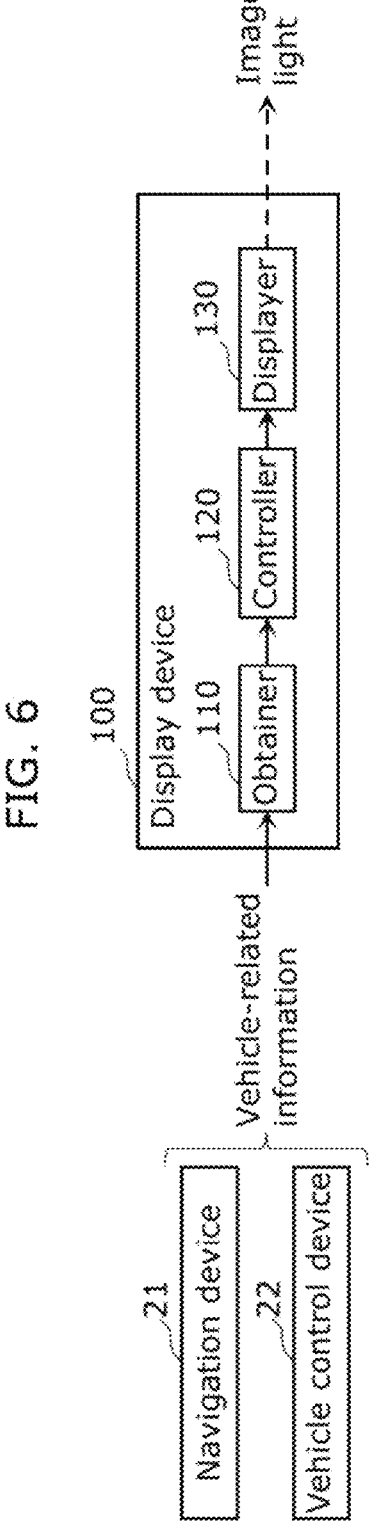
FIG. 6 is a block diagram illustrating the functional configuration of the display device according to the embodiment.

FIG. 6 is a block diagram illustrating a functional configuration of the display device according the embodiment.

Display device 100 includes obtainer 110, controller 120, and displayer 130.

Obtainer 110 obtains vehicle-related information from at least any of navigation device 21 and vehicle control device 22 installed in vehicle 2.

Navigation device 21 is a device that uses a satellite positioning system, such as Global Positioning System (GPS), and navigates vehicle 2 to a destination. Navigation device 21 outputs, as the vehicle-related information described above, vehicle site information that indicates the current site of vehicle 2, route information that indicates a route from the current site of vehicle 2 to the destination, and vehicle orientation information that indicates the traveling direction of vehicle 2.

Vehicle control device 22 is configured as an electronic control unit (ECU) installed in vehicle 2, for example, and outputs, as the vehicle-related information described above, vehicle speed information that indicates the running speed (traveling speed) of vehicle 2.

Controller 120 determines a display configuration of guidance display object 10 and generates an image based on the vehicle-related information obtained by obtainer 110. Therefore, an image generation device is implemented by a combination of obtainer 110 and controller 120. To be specific, controller 120 is a processor that determines a display position for guidance display object 10 and generates an image so that guidance display object 10 is displayed at the position. That is, the display position for guidance display object 10 transitions in response to controller 120 sequentially changing the display position determined.

In addition to the function of determining the display position described above, controller 120 has a function of determining a display configuration, including the number of display elements forming guidance display object 10 and the way of inclination, design, and shape of each display element. Controller 120 generates an image so that guidance display object 10 is displayed in the determined display configuration at the determined display position.

Displayer 130 has a function of displaying a generated image and a function of projecting light indicating the displayed image to a display medium. To this end, displayer 130 obtains a generated image from controller 120 and draws guidance display object 10. For example, displayer 130 includes a light source and an optical system, and generates image light so that guidance display object 10 is made visible to user 1. Displayer 130 then projects the image light to windshield 2a. As a result, user 1 can see guidance display object 10 in the determined display configuration at the determined display position.

[Processing Operation Flow]

Figure 7:
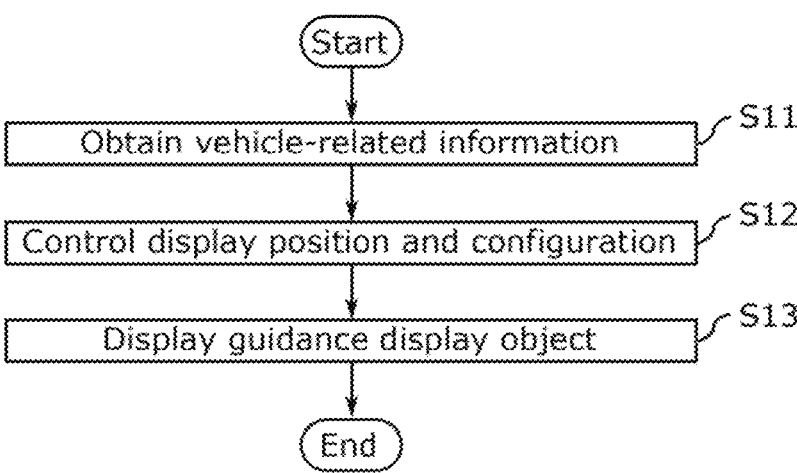
FIG. 7 is a flowchart illustrating the processing operation by the display device according to the embodiment.

Next, a flow of a processing operation by the display device configured as described above will be described with reference to FIGS. 7 to 12. FIG. 7 is a flowchart illustrating a processing operation by the display device according to the embodiment. As shown in FIG. 7, in this embodiment, obtainer 110 first obtains vehicle-related information on vehicle 2 (S11). The vehicle-related information includes vehicle site information that indicates the current site of vehicle 2 (that is, information on the current site), vehicle speed information on vehicle 2, route information that indicates a route for guiding vehicle 2 to a destination, and information on guide sites included in the route (that is, information on guide positions). Therefore, it can also be said that obtainer 110 obtains the running speed of vehicle 2 and the remaining distance from a current position to a guide position in step S11.

Controller 120 then generates an image by controlling the display position and the display configuration of guidance display object 10 (S12).

After that, displayer 130 outputs image light by displaying and projecting the generated image (S13), and the user sees guidance display object 10.

In step S12 and step S13 shown in FIG. 7, image light can be output continuously in the time domain by repeating an operation of generating and displaying an image, thereby making a video in which the virtual image of guidance display object 10 changes in the time domain visible to the user.

Figure 8:
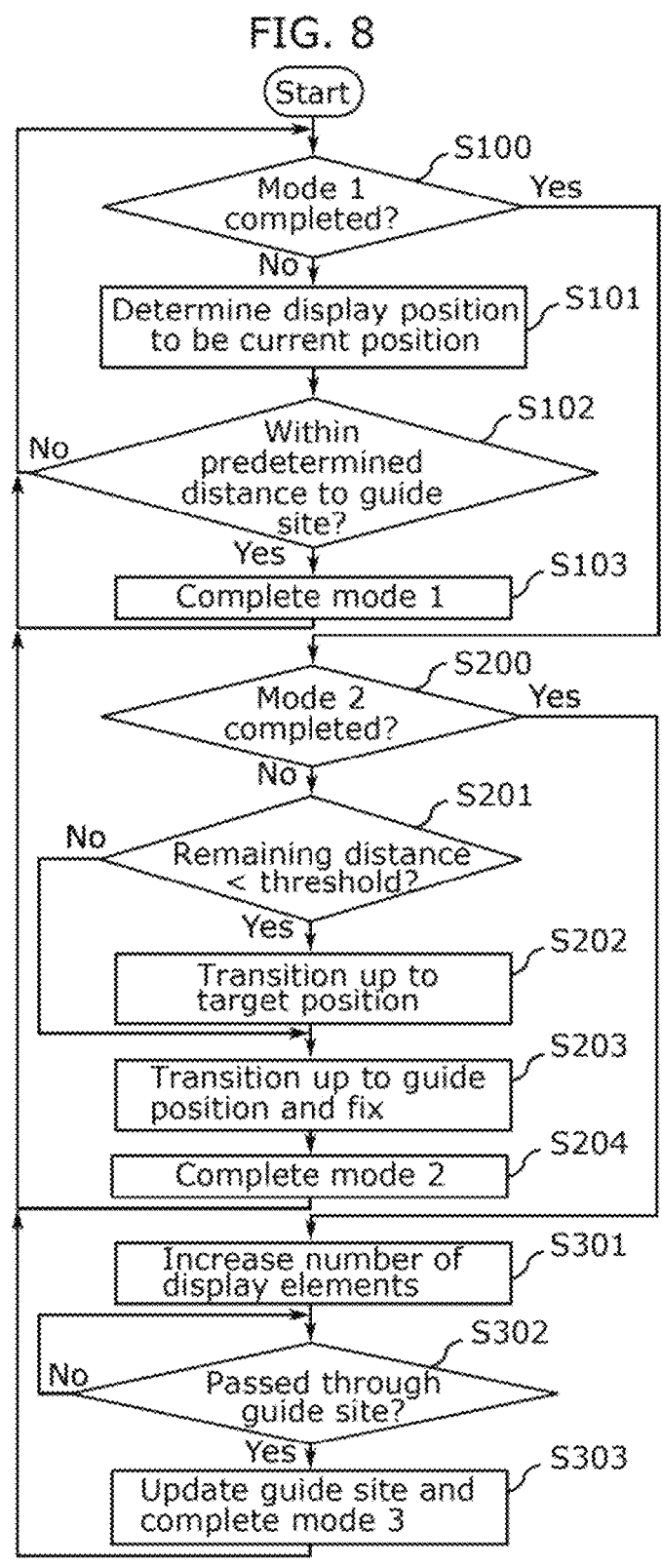
FIG. 8 is a flowchart illustrating a transition control operation for a guidance display object according to the embodiment.

The operation in step S12 can be regarded as an operation shown in FIG. 8. FIG. 8 is a flowchart illustrating a transition control operation for a guidance display object according to the embodiment. In FIG. 8, steps S101 to S103 are included in control mode 1, steps S201 to S204 are included in control mode 2, and steps S301 to S303 are included in control mode 3. Each control mode starts after the previous control mode is completed. That is, display device 100 selectively performs control modes 1 to 3.

Control mode 1 is a control in which display device 100 fixedly displays guidance display object 10 at a predetermined distance ahead of vehicle 2, rather than changing the display position of guidance display object 10. Specifically, display device 100 determines whether or not mode 1 is completed (S100), and continues performing control mode 1 if mode 1 is not completed (No in S100). In control mode 1, controller 120 first determines the display position of guidance display object 10 to be the current position (S101). As a result, guidance display object 10 continues being fixedly displayed at a position at a distance of several to several tens of meters ahead of vehicle 2. Step S100 and step S101 are repeatedly performed as long as the distance to a guide site is not smaller than a predetermined distance (No in S102). When vehicle 2 continues traveling until the distance to the guide site is smaller than the predetermined distance (Yes in S102), mode 1 is completed (S103). Then, it is determined in the determination in step S100 that mode 1 is completed (Yes in S100), the process proceeds to step S200.

Control mode 2 is a control in which display device 100 displays guidance display object 10 in such a manner that guidance display object 10 transitions through an area from the current position up to a guide position by changing the display position of guidance display object 10. Specifically, display device 100 determines whether or not mode 2 is completed (S200), and continues performing control mode 2 if mode 2 is not completed (No in S200). In control mode 2, controller 120 first calculates the remaining distance from the current position to the guide position based on the obtained vehicle-related information, and determines whether or not the calculated remaining distance is less than a threshold (S201). The threshold used in this determination is defined as a distance corresponding to the distance from the guide position to the current position, for example. Alternatively, the threshold described above may be defined as an angle formed by two straight lines each connecting one of two points at a distance corresponding to the distance from the guide position to the current position and the point of view of the user as a reference point, for example.

When the threshold is simply defined as a distance, the number of pixels corresponding to the same distance is different depending on whether the display position is farther away or closer in display range d1. On the other hand, when the threshold is defined as an angle, the distance corresponding to the same angle is different depending on whether the display position is farther away or closer in display range d1. Considering this difference, for example, the setting mode may be switchable so that the user can select distance or angle when setting the threshold.

Furthermore, when the amount of offset between the guide position and the target position can also be set by the user, the amount of offset may be defined as any of distance or angle, and the setting mode may be switchable so that the user can select distance or angle when setting the amount of offset. Note that different amounts of offset between the guide position and the target position may be required for different traveling speeds of vehicle 2. For example, when the traveling speed of vehicle is fast, the effect of the transition of guidance display object 10 may decrease because of the change of the scene superimposed while guidance display object 10 transitions up to the target position. Therefore, rather than using a constant value set by the user as the amount of offset, the amount of offset may be automatically set so that the faster the traveling speed of vehicle 2, the greater the amount of offset between the guide position and the target position is, and the more significantly guidance display object 10 transitions.

Furthermore, when the amount of offset between the guide position and the target position increases, there is a possibility that guidance display object 10 cannot be caused to transition up to the target position before vehicle 2 arrives at the guide site. Therefore, the speed of transition of guidance display object 10, that is, the rate of change of the display position, can be automatically set so that the faster the traveling speed of vehicle 2, the faster the rate of change is. In addition, when vehicle 2 is close to the guide site, that is, the remaining distance is short, there is a possibility that guidance display object 10 cannot also be caused to transition up to the target position before vehicle 2 arrives at the guide site. The speed of transition of guidance display object 10, that is, the rate of change of the display position, may be automatically set so that the shorter the remaining distance, the faster the rate of change is.

Furthermore, as described above, the way of transition of guidance display object 10 in display range d1 is different depending on whether distance or angle is used as the reference for processing (image generation). Therefore, when the rate of change is defined as distance per unit time, the rate of change may appear to change in display range d1 even if the rate of change is constant. In view of this, when the rate of change is defined as distance per unit time, the rate of change may be controlled to appear constant in display range d1 by setting the rate of change to be faster when the display position is farther away and setting the rate of change to be slower when the display position is closer. For example, the rate of change may vary with the display position of guidance display object 10 so that the rate of change is faster between the guide position and the target position than between the current position and the guide position.

Referring back to FIG. 8, when the calculated remaining distance is greater than or equal to the threshold (No in S201), the distance is sufficient for the transition, and controller 120 causes guidance display object 10 to transition through an area from the current position up to the guide position and fixes guidance display object 10 at the guide position (S203). On the other hand, when the calculated remaining distance is smaller than the threshold (Yes in S201), the distance is insufficient for the transition, and controller 120 causes guidance display object 10 to transition through an area from the current position up to the target position to ensure a sufficient distance for the transition (S202), and then causes guidance display object 10 to transition through an area from the target position up to the guide position and fixes guidance display object 10 at the guide position (S203). In this way, in any case, guidance display object 10 transitions for a sufficient distance for catching the eye of the user, so that the user can more easily see guidance display object 10. After that, mode 2 is completed (S204). Then, it is determined in the determination in step S200 that mode 2 is completed (Yes in S200), and the process proceeds to step S301.

Figure 9:
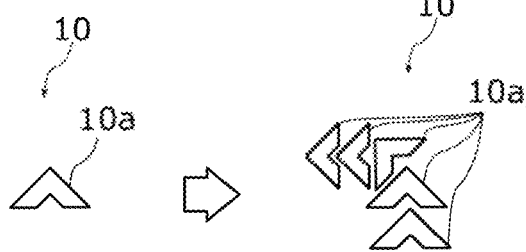
FIG. 9 is a diagram illustrating an example of an increase of display elements according to the embodiment.

Control mode 3 is a control in which display device 100 changes the display configuration of guidance display object 10 and maintains the configuration until vehicle 2 passes through the guide site. Specifically, in control mode 3, controller 120 first increases display elements forming guidance display object 10 (S301). This is achieved as shown in FIG. 9. FIG. 9 is a diagram illustrating an example of the increase of display elements according to the embodiment. Guidance display object 10 formed by one display element 10a as shown in the left part of FIG. 9 is changed to guidance display object 10 formed by a plurality of display elements 10a like the so-called carpet presentation to make the traveling direction more recognizable. As can be seen, the display configuration determined by controller 120 includes the number of display elements 10a forming guidance display object 10 and the orientation of each display element 10a. In this example, after guidance display object 10 is fixed at the guide site, the number of display elements 10a forming guidance display object 10 is increased, and some of display elements 10a are arrows that indicate different directions as the course changes.

Referring back to FIG. 8, after that, whether or not vehicle 2 has passed through the guide site is determined (S302). While vehicle 2 has not passed through the guide site (No in S302), the determination in step S302 is repeated. When vehicle 2 has passed through the guide site (Yes in S302), the guide site is updated to the next guide site on the travel route, and mode 3 is completed (S303). After that, the processing in step S100 is started again for the updated guide site.

Figure 10:
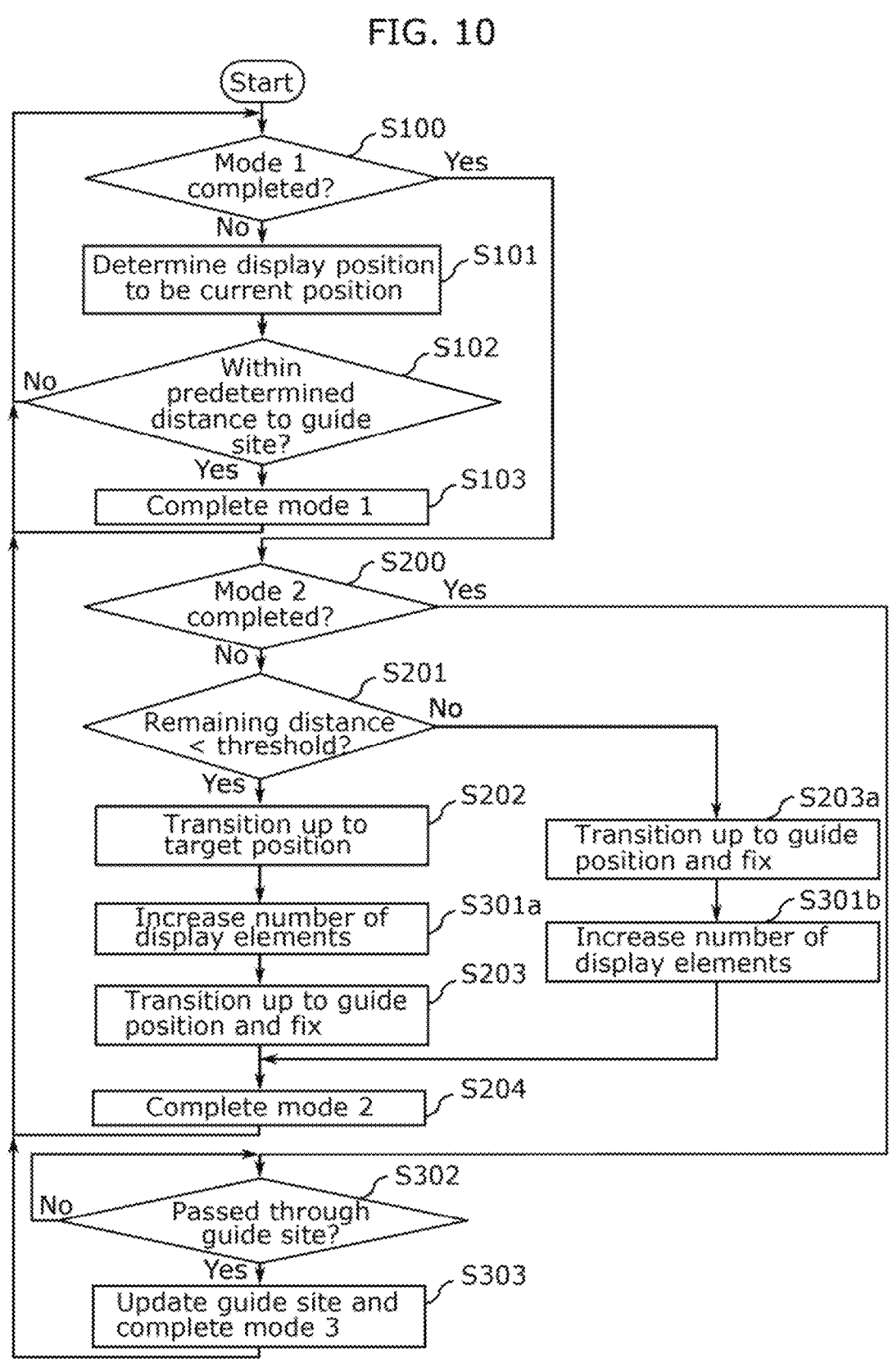
FIG. 10 is a flowchart illustrating a transition control operation for a guidance display object according to another example of the embodiment.

Note that although the display configuration is changed after guidance display object 10 is fixed at the guide position in step S203 in the above description, this is not intended to be limiting. For example, FIG. 10 is a flowchart illustrating a transition control operation for a guidance display object according to another example of the embodiment. The flowchart shown in FIG. 10 differs from the flowchart shown in FIG. 8 in that instead of step S301, steps S301a and S301b are performed at different timings. Note that although the process in FIG. 10 also includes step S203a of causing guidance display object 10 to transition up to the guide position and fixing guidance display object 10 at the guide position as with step S203, this step is added for convenience of description of branching in the process and does not indicate any substantially different processing.

In this other example, steps S301a and S301b are performed in control mode 2, that is, the increase of display elements 10a forming guidance display object 10 is performed in control mode 2. More specifically, depending on the determination result of the determination of whether or not the remaining distance is smaller than the threshold (S201), step S301b of increasing display elements 10a may be performed after guidance display object 10 is fixed at the guide position in step S203a, or step S301a of increasing display elements 10a may be performed before guidance display object 10 is fixed at the guide position in step S203.

When the calculated remaining distance is smaller than the threshold (Yes in S201), step S203 is performed after display elements 10a forming guidance display object 10 are increased (after S301a). The overall size of guidance display object 10 increases when the number of display elements 10a increases. However, in the processing order described above, guidance display object 10 is less likely to partially lie off (be partially out of) display range d1 because of the increase in size of guidance display object 10 when the guide site is too close to the current site and is located near the lower edge of display range d1, for example. On the other hand, when the calculated remaining distance is greater than or equal to the threshold (No in S201), step S203a is performed before display elements 10a forming guidance display object 10 are increased (before S301b). In this case, the possibility that the guide site is too close to the current site and guidance display object 10 partially lies off display range d1 is low, and the process can be performed in the order described with reference to FIG. 8. On the contrary, if display elements 10a are increased before guidance display object 10 is fixed at the guide position, guidance display object 10 located closer to the current position than to the guide position may lie off display range d1. Therefore, to prevent the lying off, the order of steps needs to be changed as described above.

Furthermore, the display configuration may be changed to decrease the number of display elements 10a of guidance display object 10 whose display elements 10a have been once increased, before the guide site is updated. FIG. 11 is a diagram for describing changes in display configuration of display elements according to yet another example of the embodiment. In FIG. 11, how the number of display elements 10a is decreased according to the distance between vehicle 2 and the guide site is summarized in the form of a table. As shown in FIG. 11, controller 120 may determine the display configuration to decrease the number of display elements 10a as vehicle 2 continues traveling and approaches the guide site (comes closer to the guide site).

Note that in that case, when the remaining distance is smaller than the threshold (the remaining distance is 35 m, for example), the number of display elements 10a that would otherwise be increased to 5 may be increased to 3 from the beginning. Thus, as shown in FIG. 12, controller 120 may make a correction by addition of the distance from the guide position to guidance display object 10 so that the maximum number of display elements 10a of guidance display object 10 can be displayed, while decreasing the number of display elements 10a as vehicle continues traveling and approaches the guide site (comes closer to the guide site). In that case, although the distance from the guide position to guidance display object 10 changes during the transition through an area from the target position up to the guide position in step S203, guidance display object 10 formed by the maximum number of display elements 10a can be displayed by appropriately setting the amount of offset between the guide position and the target position.

(Other Forms)

Although a display device according to one or more aspects of the present disclosure is described above based on the above embodiment, the present disclosure is not limited by the above embodiment. Forms obtained through various modifications to above embodiment that can be conceived by a skilled person, so long as they do not depart from the essence of the present disclosure, may be included in the present disclosure.

In the above embodiment, each element may be configured using dedicated hardware, or may be implemented by executing a software program suitable for the element. Each element may be implemented by a program execution unit such as a central processing unit (CPU) or a processor reading and executing a software program recorded on a recording medium such as a hard disk or semiconductor memory.

Furthermore, although an image having the shape of an arrow is displayed as the guidance display object, the shape of the guidance display object is not limited to the shape of an arrow and can be any shape, such as a triangle or an arrow, that indicates a direction for guidance of a route. Furthermore, the guidance display object may have an elongated carpet-like shape and be displayed by being superimposed on the road surface. Furthermore, although the guidance display object is displayed to guide the vehicle to the destination, the guidance display object may be displayed for other purposes or uses as far as the guidance display object is displayed based on the orientation of the vehicle. For example, the guidance display object may be an image that indicates the orientation itself of the vehicle or an image that indicates the expected travel direction of the vehicle estimated from the orientation of the vehicle and the rotational angle of the steering.

Furthermore, although the configuration described in the above embodiment includes a navigation device, a vehicle control device, and a display device as separate devices, this is not intended to be limiting. For example, the display device may be integrated with at least one of the other devices into one device. For example, the navigation device and the display device may be integrated into one device. Furthermore, a group of one or more devices formed by an arbitrary combination of the navigation device, the vehicle control device, and the display device described above is also included in the scope of the present disclosure.

It should be noted that the subsequent cases are also included in the present disclosure.

(1) At least one of the devices described above is a computer system configured with, specifically, a microprocessor, a Read Only Memory (ROM), a Random Access Memory (RAM), a hard disk unit, a display unit, a keyboard, a mouse, and so on. The RAM or the hard disk unit stores a computer program. The microprocessor operates according to the computer program, so that the functions of the at least one device is achieved. Here, the computer program includes a combination of instruction codes indicating instructions to be given to the computer so as to achieve a specific function.

(2) Some or all of the elements included in at least one of the devices above may be realized as a single system large scale integration (LSI). The system LSI is a super multifunctional LSI manufactured by integrating a plurality of elements onto a single chip. To be more specific, the system LSI is a computer system configured with a microprocessor, a ROM, and a RAM, for example. The RAM stores a computer program. The microprocessor operates according to the computer program so that a function of the system LSI is achieved.

(3) Some or all of the elements included in at least one of the devices above may be implemented as an IC card or a standalone module that can be inserted into and removed from the device. The IC card or the module is a computer system configured with a microprocessor, a ROM, and a RAM, for example. The IC card or the module may include the aforementioned super multifunctional LSI. The microprocessor operates according to the computer program so that a function of the IC card or the module is achieved. The IC card or the module may be tamper-resistant.

(4) The present disclosure may be the methods described above. Furthermore, the present disclosure may be a computer program for causing a computer to execute each of these methods. Moreover, the present disclosure may be a digital signal of the computer program.

Furthermore, the present disclosure may be the aforementioned computer program or digital signal recorded on a computer-readable recording medium, such as a flexible disk, a hard disk, a Compact Disc (CD)-ROM, a DVD, a DVD-ROM, a DVD-RAM, a Blu-ray (registered trademark) disc (BD), or a semiconductor memory. The present invention may also be the digital signal recorded on such a recording medium.

Furthermore, the present disclosure may be the aforementioned computer program or digital signal transmitted via a telecommunication line, a wireless or wired communication line, a network represented by the Internet, and data broadcasting, and so on.

Furthermore, by transferring the recording medium having the aforementioned program or digital signal recorded thereon or by transferring the aforementioned program or digital signal via the aforementioned network or the like, the present disclosure may be implemented by a different independent computer system.

Further Information about Technical Background to this Application

The disclosure of the following patent application including specification, drawings, and claims are incorporated herein by reference in its entirety: Japanese Patent Application No. 2024-080029 filed on May 16, 2024.

INDUSTRIAL APPLICABILITY

A display device according to the present disclosure is applicable to, for example, a vehicle head up display, and the like.

The invention claimed is:

1. A display device comprising:
a displayer that displays, over a travel route that includes one or more guide sites that a mobile body will pass through in future, a guidance display object for guidance along the travel route, each of the one or more guide sites being a site at which a course of the mobile body is to change;
an obtainer that updates a guide site that the mobile body will pass through next among the one or more guide sites, and obtains, for the guide site updated, a remaining distance from a current position being displayed up to a guide position being displayed, the current position corresponding to the mobile body, the guide position corresponding to the guide site updated; and
a controller that determines a display position of the guidance display object when the guidance display object is to be displayed, and causes the displayer to display the guidance display object at the display position determined, wherein
the controller:
changes the display position to be determined to cause the guidance display object to transition through an area from the current position up to the guide position, when the remaining distance is greater than or equal to a threshold value; and
changes the display position to be determined to cause the guidance display object to transition through an area from the current position up to a target position that is offset ahead of the guide position, when the remaining distance is less than the threshold value.

2. The display device according to claim 1, wherein after changing the display position to be determined to cause the guidance display object to transition through the area from the current position up to the target position when the remaining distance is less than the threshold value, the controller further changes the display position to be determined to cause the display position to transition through an area from the target position up to the guide position.

3. The display device according to claim 1, wherein the controller:

determines a display configuration of the guidance display object when the guidance display object is to be displayed, and causes the displayer to display the guidance display object in the display configuration determined; and after changing the display position to be determined to cause the guidance display object to transition through the area from the current position up to the target position when the remaining distance is less than the threshold value, further changes the display configuration to be determined.

4. The display device according to claim 3, wherein the display configuration includes a total number of display elements included in the guidance display object, and the controller:

after changing the display position to be determined to cause the guidance display object to transition through the area from the current position up to the target position when the remaining distance is less than the threshold value, changes the display configuration to cause the total number of the display elements to increase; and changes the display configuration to cause the total number of the display elements that has been increased to decrease as the mobile body approaches the guide site.

5. The display device according to claim 1, wherein the threshold value is defined by a length of a distance or by an angle formed between straight lines each connecting a reference point and a different one of two points, the two points being separated from each other by the distance.

6. The display device according to claim 1, wherein an amount of the offset between the guide position and the target position is defined by a length of a distance or by an angle formed between straight lines each connecting a reference point and a different one of two points, the two points being separated from each other by the distance.

7. The display device according to claim 1, wherein the obtainer further obtains a traveling speed of the mobile body, and an amount of the offset between the guide position and the target position is larger as the traveling speed obtained is faster.

8. The display device according to claim 1, wherein the obtainer further obtains a traveling speed of the mobile body, and the controller changes the display position to be determined to cause a rate of change of the display position to be faster as the traveling speed obtained is faster.

9. The display device according to claim 1, wherein the controller changes the display position to be determined to cause a rate of change of the display position to be faster as the remaining distance is shorter.

10. The display device according to claim 1, wherein when the remaining distance is less than the threshold value, the controller changes the display position to be determined to cause a rate of change of the display position to be faster through an area from the guide position up to the target position than through the area from the current position to the guide position.

11. The display device according to claim 1, wherein the controller projects an image light toward a display medium of the mobile body to make a virtual image of the guidance display object visible to a user of the mobile body, the virtual image being formed beyond the display medium by the image light that is reflected from the display medium.

12. A display method to be executed by a computer, the display method comprising:

displaying, over a travel route that includes one or more guide sites that a mobile body will pass through in future, a guidance display object for guidance along the travel route, each of the one or more guide sites being a site at which a course of the mobile body is to change;

updating a guide site that the mobile body will pass through next among the one or more guide sites, and obtaining, for the guide site updated, a remaining distance from a current position being displayed up to a guide position being displayed, the current position corresponding to the mobile body, the guide position corresponding to the guide site updated; and determining a display position of the guidance display object when the guidance display object is to be displayed, and controlling to cause, in the displaying, the guidance display object to be displayed at the display position determined, wherein the controlling includes:

changing the display position to be determined to cause the guidance display object to transition through an area from the current position up to the guide position, when the remaining distance is greater than or equal to a threshold value; and changing the display position to be determined to cause the guidance display object to transition through an area from the current position up to a target position that is offset ahead of the guide position, when the remaining distance is less than the threshold value.

13. A non-transitory computer-readable recording medium having recorded thereon a program for causing the computer to execute the display method according to claim 12.

* * * * *